Dec. 15, 1964 A. BEKEY 3,161,795
INDUCTION MOTOR INCLUDING TWO COMMUTATED
WINDINGS FOR SPEED CONTROL
Filed Oct. 16, 1961 3 Sheets-Sheet 1

INVENTOR:
Andrew Bekey
Attorneys

INVENTOR:
Andrew Bekey

Attorneys

Dec. 15, 1964   A. BEKEY   3,161,795
INDUCTION MOTOR INCLUDING TWO COMMUTATED
WINDINGS FOR SPEED CONTROL
Filed Oct. 16, 1961   3 Sheets-Sheet 3
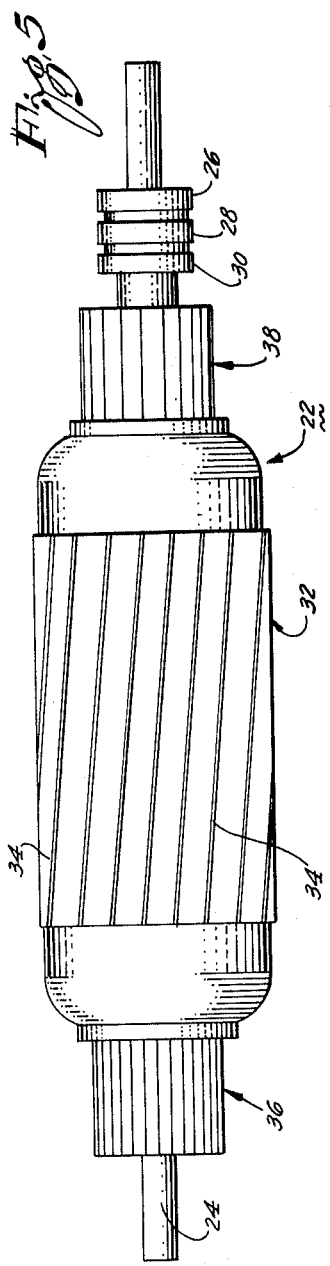
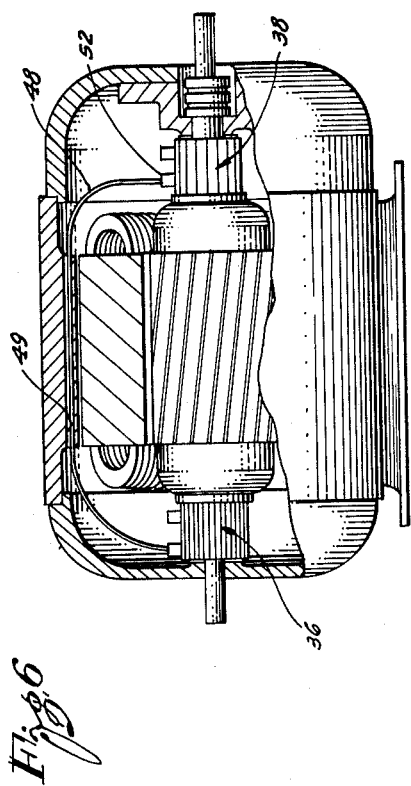
INVENTOR:
Andrew Bekey
By Smyth, Roston & Pavitt
Attorneys

United States Patent Office 3,161,795
Patented Dec. 15, 1964

3,161,795
INDUCTION MOTOR INCLUDING TWO COMMUTATED WINDINGS FOR SPEED CONTROL
Andrew Bekey, Los Angeles, Calif., assignor to Genisco, Incorporated, Los Angeles, Calif., a corporation of California
Filed Oct. 16, 1961, Ser. No. 145,118
12 Claims. (Cl. 310—173)

The invention relates to electric motors and in particular to a variable-speed induction motor of the type that employs a rotor-mounted commutator winding arrangement from which a voltage may be collected and impressed on the stator winding providing variable control of the voltage level and frequency therein and resulting speed control.

It has long been desirable to provide accurate speed regulation in alternating current motors and this has been accomplished in certain existing designs. A typical prior art design provides a voltage collecting commutator connected winding carried by the rotor whereby the collected voltage is impressed or injected into a stationary stator winding in correct direction and phase, thereby accommodating controllable variation of the secondary induced voltage in the stator winding whereby rotor speed is rendered variable. This design employs a conventional laminated and slotted rotor, carrying in the slots thereof a primary phase winding to receive line current via conventional slip rings. The rotor further incorporates a slot-carried adjusting winding electrically connected to a shaft-carried commutator at one end thereof.

In three-phase operation, for example, the stator is provided with three separated secondary coil windings, each having opposite ends brush connected, all of the brushes being arranged to ride on a common commutator. The brushes are so mounted on the commutator that convenient mechanical angular variation is provided. It will be understood by those familiar with the art that, when one set of phase-connected brushes ride the same commutator segment, a direct short circuit results and no voltage is impressed on the stator winding. On the other hand, as the brushes are separated mechanically, a voltage of rotor frequency is picked up from the commutator and injected into the secondary winding, the magnitude of the voltage depending upon the degree of brush separation. The amount of brush separation and, therefore, the magnitude of the injected voltage is controlled by the maximum mechanical separation available for a given brush set and motor speed. The injected voltage is at slip frequency and is electrically combined in the secondary coil winding with a direct induced secondary voltage to control voltage level and therefore regulate speed. When the impressed or injected voltage is brought to a level equalling the induced voltage after subjection to the primary-secondary transformation ratio, the rotor will be brought to a halt. It is, therefore, evident that in these prior art motors, it has been theoretically possible to offer speed regulation from zero to synchronous speed.

However, the motors heretofore employed have, in fact, been subject to many disadvantages. An important disadvantage relates to the limitation on the available brushes' mechanical travel. For example, the number of brushes required on a polyphase commutator rotor is directly related to the number of poles employed in the design. A two-pole rotor, for example, requires three brushes, while a four-pole rotor requires six, and a six-pole rotor will employ nine brushes. That is, one brush per pole per phase is required in a given design. The electrical separation between respective brushes is 120 electrical degrees regardless of the number of brushes employed. However, as the number of brushes increases, the angular mechanical separation available between the brushes decreases. Assume, for example, it is required to operate a typical prior art motor, over a speed range of 180 r.p.m. between 3420 r.p.m. and 3600 r.p.m. In such a typical design employing a two-pole arrangement, the voltage variation required would be only five percent of the total voltage induced on the secondary by the primary coil at machine standstill. Therefore, if the maximum voltage produced by the commutator winding is only 5% of the secondary induced voltage, then employing three brushes, 120 degrees of mechanical travel would be available and a resulting speed change of 1½ r.p.m. per degree of adjustment would be provided. In the same manner, a 180 r.p.m. speed range on a four-pole motor having a synchronous speed of 1800 r.p.m. will provide a 3 r.p.m. change per each degree of brush adjustment.

However, as the desired speed variation range increases, it becomes mechanically more difficult to obtain the adjustment required. For example, if it is desired to operate the first mentioned typical motor between zero and 180 r.p.m., it is necessary to produce an impressed voltage between the brushes approximately equal to the induced standstill voltage in the secondary. Within the desired speed range, there would only be available five percent of the maximum brush separation or six mechanical degrees to produce the voltage variation. It will be readily understood, therefore, that in this case a 30 r.p.m. change corresponds to a one degree brush shift. The same condition prevails even though a motor design employing more poles is adopted. For example, a four-pole motor would have a 60 degree maximum brush separation and 10 percent of this range would be available for adjusting the speed from zero to 180 r.p.m. Again, the useful regulating range is 6 mechanical degrees. It will be readily apparent that the physical limitation of brush adjustment is entirely unsatisfactory to accommodate the desired fine regulation and accurate repeatability required in today's modern industrial applications for low speed service.

Accordingly, the invention herein disclosed comprehends an improved commutator type motor which will offer a desired degree of fine speed adjstment throughout any portion of a design speed range. Additionally, the invention comprehends an arrangement of the type described wherein undue sparking of the brushes associated with the commuted coils is importantly reduced. Further, the arrangement provides a vernier type rough and fine speed adjustment whereby both major rough and minor fine speed adjustments can be quickly achieved. The arrangement also offers a motor having a constant speed change per mechanical degree of brush movement regardless of the actual speed range.

These and other features of the invention will be more readily understood by reference to the associated drawings and the following specification, wherein:

FIGURE 5 is a side elevational view of a rotor that may typically be employed in the invention; and FIGURE 6 is a fragmentary, partially schematic side view showing a preferred series brush arrangement employed in the design.

Figure 1:
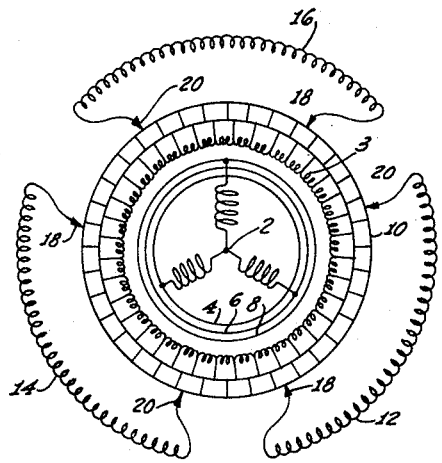
FIGURE 1 is as chematic arrangement of a typical prior art motor embodiment.

Directing attention to FIGURE 1 which schematically illustrates a typical prior art variable speed A.C. motor, those skilled in the art will understand that the numeral 2 indicates a primary coil winding arranged to receive a primary line current via its respective electrical connections to slip rings 4, 6 and 8. The primary coil 2 is, of course, rotor mounted as will hereinafter appear. A commutator 10 of conventional design is electrically connected in the usual manner to an adjusting winding 3, the latter also being rotor carried. In the polyphase arrangement illustrated, the stator is provided with three secondary winding 12, 14 and 16. It will be understood that the windings 12, 14 and 16 are separated, each having its opposite ends connected to brushes 18 and 20, respectively. The brushes 18 and 20 are mounted in separate conventional brush riggings which can be mechanically rotated on the commutator 10 and relative to each other as will hereafter appear.

Upon application of a primary polyphase voltage to the winding 2, a secondary voltage is directly induced in the secondary windings 12, 14 and 16 and, additionally, a voltage is induced on adjusting winding 3 which is connected to commutator 10. This latter voltage will be picked up by the brushes 18 and 20 riding the commutator and impressed on the associated secondary winding. It will also be understood that the magnitude of this impressed voltage is directly related to the mechanical degree of separation of the brushes 18 and 20 of the respective winding. Additionally, the direction of the impressed voltage and the phase thereof is controllable in a conventional manner, i.e., by brush position. As a result of the impression of the commutator picked-up voltage on the secondary windings and its opposition to the induced secondary voltage, the induced secondary voltage in the secondary windings is controlled as to voltage level and phase, resulting in a variation of the speed of the rotor.

Figure 2:
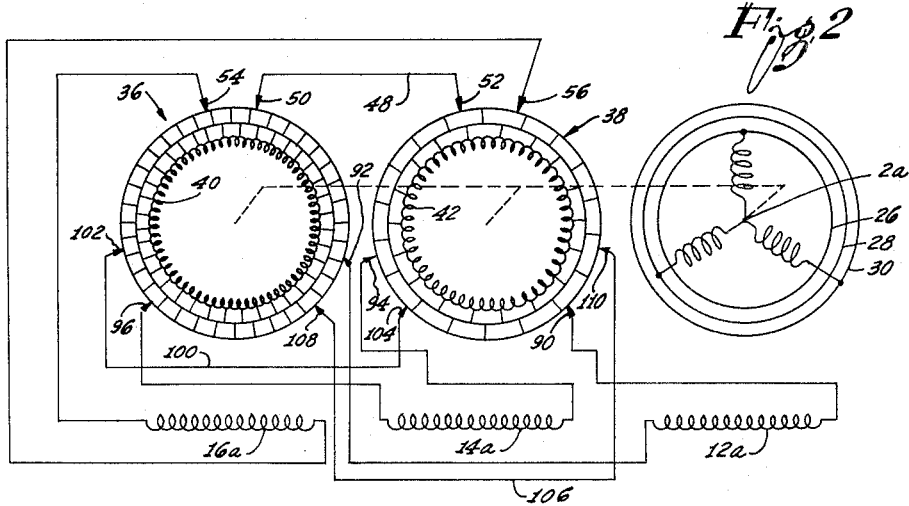
FIGURE 2 is a schematic arrangement of a typical motor employing the disclosed invention.

In order to improve the speed control and eliminate the mentioned disadvantages, it is first necessary to employ a unique rotor arrangement, and for an understanding thereof, attention is directed to FIGURE 5. The rotor is indicated generally at 22 and comprises a main shaft 24 having a plurality of slip rings 26, 28 and 30 mounted at one end thereof. The slip rings 26, 28 and 30 are electrically connected to the polyphase primary winding 2a in the conventional manner (FIGURE 2). A plurality of laminations 32 are centrally arranged on the shaft 24 and are provided with the coil carrying slots 34, 34. A first commutator 36 is mounted adjacent and at one end of the laminations 32 while a second commutator 38 is mounted at the other end of the laminations 32 and immediately adjacent thereto. As in conventional motors, the primary winding 2a is carried within the slots 34 of the lamination 32. In a preferred embodiment of the arrangement, it is desirable, as will hereafter appear, to vary the number of bars in the respective commutators 36 and 38.

Figure 3:
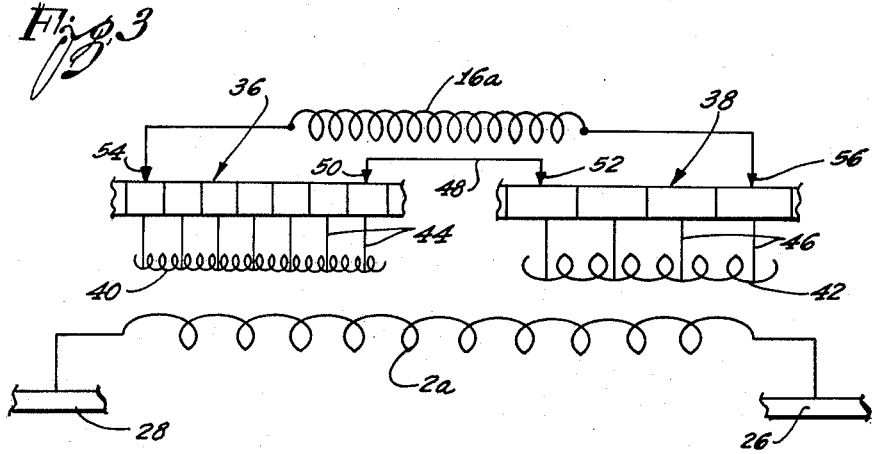
FIGURE 3 is a fragmentary schematic arrangement of one phase of the motor disclosed in FIGURE 2.
Figure 4:
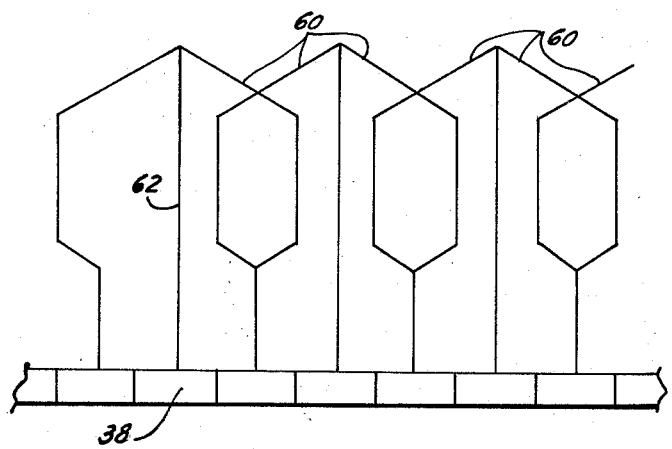
FIGURE 4 is a fragmentary schematic arrangement illustrating the modification of the invention that may be employed.

Attention is now directed to FIGURE 3 which fragmentarily and schematically illustrates a single phase employed in the polyphase motor which is the subject of this disclosure. One phase of the primary coil winding is indicated at 2a while one segment of a secondary coil winding is indicated at 16a. A major adjustment coil 40 is provided in appropriate magnetic relationship with the coil 2a. A minor or fine adjusting coil 42 is also provided, again in appropriate magnetic relationship, with the primary coil 2a. The commutator 36 is electrically connected as at 44, 44 with the coil 40, while the coil 42 is electrically connected as at 46, 46 with the commutator 38. A flexible transfer lead 48 interconnects the commutator bars 36 and 38 by virtue of the end connected brushes 50 and 52. It will be understood that the brushes 50 and 52 may be relatively fixedly mounted in appropriate electrical relation with their respective commutators as relative motion of same is not necessary to the practice of the disclosed invention. Also, the lead 48 should pass outside the magnetic circuit of the motor, as for example, through holes 49 in the motor housing and not through stator slots of FIGURE 6.

In order to close the circuit to the secondary coil 16a, it is necessary to provide its opposite ends with brushes 54 and 56, the brush 54 being electrically mounted on the commutator 36 and the brush 56 being electrically mounted on the commutator 38. Both brushes 54 and 56 are arranged for angular mechanical variation on the related commutator.

It will be further understood that the primary coil 2a, the major adjusting coil 40, and the minor or fine adjusting coils 42 are all disposed in the respective slots 34 of the rotor 22. It will be understood by those familiar with this art, that the number of coils 40 and 42 disposed in the slots 34 may be varied depending on design requirements. However, for a typical illustrative example, we could assume that the winding 40 is provided with 10 turns per coil per each slot 34 while the winding 42 is provided with one turn per coil per each slot 34. That is, the effective turns in coil 42 represent a fraction of the effective turns in coil 40. Further, it could be understood that the maximum voltage adjustment via brush 54 on commutator 36 could, by appropriate consideration of the number of effective turns in coil 40, produce a large voltage change, for example, that approaching the induced standstill voltage in the secondary coil 16a by the primary coil 2a. It will further be understood that, responsive to appropriate design of the minor adjusting coil 42, the injected voltage variation due to movement of the brush 56 on the commutator 38 could be very small relative to the variation resulting from the coil 40. Obviously, the smaller the voltage change per mechanical degree of brush translation, the less the incremental speed variation and the finer the speed setting available.

Returning to FIGURE 2, which schematically illustrates the structure above described relative to FIGURE 3 but shows the multiple phase arrangement of the variable speed A.C. motor, it will be noted that the commutators 36 and 38 are independently illustrated and the secondary coils 12a, 14a and 16a are also illustrated. The rough adjusting winding 40 is electrically coupled with the commutator 36 while the fine adjusting winding 42 is electrically coupled with the commutator 38. Considering the secondary winding 12a, it will be noted that one brush 90 is arranged to ride the commutator 38 while another brush 92 is arranged to engage the commutator 36. The secondary winding 14a is provided with a first brush 94 engaging commutator 38 and a second brush 96 engaging commutator 36. Again, the secondary coil 16a has its first brush 56 engaging commutator 38 and its second brush 54 engaging commutator 36. The circuit through each secondary phase coil is completed by appropriate brushes and leads interconnecting the commutators. For example, coil 16a is provided with lead 48 and brushes 50 and 52. Coil 14a is provided with lead 100 and brushes 102 and 104. Likewise, coil 12a is provided with lead 106 and brushes 108 and 110.

Another feature of the present disclosure relates to improved commutation. For example, and directing attention to FIGURE 3, it will be understood that in the lead 48 connecting brushes 50 and 52, which ride the respective commutators 36 and 38, that a relatively high secondary current will circulate therein. In the type of A.C. arrangement hereunder consideration, the stator and rotor are uniformly slotted, thus eliminating the possibility of interpoles and commutation has to take place only with the aid of brush resistance or high resistance leads from a given coil to the commutator. This aspect of commutation which is roughly comparable to that known as D.C. commutation is generally referred to as current commutation while the phenomena connected with the transformer action between primary and commutator windings is frequently referred to as voltage commutation. To further explain, it will be recalled that the primary and adjusting windings are both located on the rotor and occupy the same armature slots. Therefore, it will be understood that regardless of armature r.p.m., the primary winding will always induce a voltage of line frequency in the immediately adjacent adjusting winding. Recalling that in this disclosure the brushes are stationary but the exciting field rotates, it will also be understood that the winding within the armature physically rotates, adding or subtracting the armature speed to the A.C. rotating field and, depending upon the direction of armature rotation. The resultant speed of the magnetic field will induce currents in the stationary secondary winding at slip frequency. On the other hand, the currents captured by the brushes on the commutators are of slip frequency because the spinning rotor substitutes one coil against another and at each instant the stationary brush receives current from a different coil which was in the same physical position as another immediately preceding it. Thus, the adjusting winding and secondary winding can be electrically coupled because the commutators and stationary brushes change line frequency to slip frequency.

It will further be understood that with regard to each short-circuited adjusting coil, that a reactance voltage caused by the reversal of the current in that short-circuited coil will be concurrently present with the transformer voltage induced by the primary winding. This induced voltage in this adjusting winding will be of constant magnitude around the entire circumference of the armature. This voltage in the shorted coil produces a relatively high current which results in strong sparking. In the present arrangement, the fine adjusting winding may be utilized as a damping or discharge winding. To effect this utilization, the rough adjusting winding should be approximately full pitch as is practical and wave wound. The fine adjusting winding, on the other hand, is preferably of shorter pitch and lap wound to the effect that the shorted coil in the rough adjusting winding is inductively coupled to the fine adjusting winding whereby provision is made for an effective discharge circuit absorbing the induced voltage produced by commutation and the inductive coupling.

In the event an extremely fine control is required in the fine adjusting windings, the effective turns per coil can be further reduced to less than 1 by use of a very short pitched coil. Additional reduction of the effective turns can be achieved by using half turns of a short pitch coil and to illustrate the structural arrangement now referred to, attention is directed to FIGURE 5 wherein the numeral 38 indicates the commutator associated with the fine adjusting windings. The numerals 60 indicate the line of a one-turn lap wound coil. It is possible, by connecting a transverse lead or line 62 to the apex of each coil and the opposite end thereof being brought to the commutator intermediate the points of connection of line 60 to the commutator whereby every conductor instead of every complete coil is connected to the commutator. In this way, a very fine adjustment of the winding 42 can be achieved because the voltage corresponding to one-half turn of every coil is available for adjustment.

From the above, it can be seen that the disclosed arrangement having a rotor embodying a plurality of polyphase commutators and the particular arrangement of series connected adjusted windings electrically associated with the commutators extends the fine adjustability of the speed to any part of the designed speed range. Thus, the disadvantage of having fine speed adjustments only over a limited range, and only at the highest speed and as in the prior art arrangements, is avoided. To those skilled in the art, it will be apparent that the degree of rough and fine adjustment available on a particular machine is at the discretion of the motor designer. The degree of adjustment depends merely on the ratio of effective turns in the rough adjusting windings to the effective turns in the fine adjusting windings.

The invention as illustrated is by way of illustration and not limitation and may be subject to various modifications without departing from the spirit thereof or the scope of the appended claims.

I claim:
1. In a polyphase alternating current variable speed induction motor, a rotor, a plurality of commutators carried by the rotor, slip rings carried by the rotor, primary coil windings carried by the rotor and electrically coupled to the slip rings, first adjusting windings carried by the rotor and electrically coupled to one of said commutators, second adjusting windings carried by the rotor and electrically coupled to the other of said commutators, both the first and second adjustable windings operative at the same time to provide a variable adjustment in the speed of the motor, a stator, secondary coil windings carried by the stator, and variable electrical coupling means interconnecting the secondary windings and the commutators.

2. A motor according to claim 1, wherein the effective turns of said first adjusting windings is greater than the effective turns of said second adjusting windings.

3. A motor according to claim 2, wherein said first adjusting windings are wave wound and of full pitch, and the second adjusting windings are lap wound and of shorter pitch than of said first adjusting winding.

4. A motor according to claim 3, wherein the variable electrical coupling means comprises a first set of mechanically variable brushes for each phase riding the respective commutators and connected to the terminals of the secondary winding, and a second set of brushes and a lead interconnecting same for each phase riding the respective commutators.

5. A motor according to claim 4, wherein said lead passes outside the magnetic circuit of the motor.

6. In a polyphase alternating current variable speed motor, a stator, a fixed winding carried by the stator, a rotor, a primary coil carried by the rotor and movement therewith, means to electrically energize the primary coil whereby a voltage at line frequency is induced in the fixed winding, a plurality of adjusting windings carried by the rotor inductively coupled to the primary winding and to each other whereby a voltage of rotor frequency is induced in the adjusting windings, commutation means for the respective adjusting windings, and variable brush and lead means electrically associated with the commutation means to arrange said adjusting windings in electrical series relation.

7. A motor according to claim 6, wherein said brush and lead means comprises a first brush set connected to terminals of said fixed winding and electrically connected to respective commutation means, and a second brush set electrically interconnecting the commutation means.

8. A motor according to claim 7, wherein the respective adjusting windings have different effective turns, windings and pitches.

9. In a polyphase alternating current variable speed motor, a slotted stator, a secondary winding fixedly carried by the stator in said slots, a rotor having slotted laminations centrally thereof, a first commutator adjacent one end of the rotor having a plurality of segments thereon, a second commutator carried by the rotor adjacent its other end and having a lesser number of segments thereon than said first commutator, a primary coil disposed in the slots in said rotor, slip rings electrically coupled to the primary coil to accommodate energizing of same, a first adjusting coil electrically coupled to the first mentioned commutator and disposed in said slots in physical justaposition to said primary coil, a second adjusting coil electrically coupled to said second commutator and disposed in said slots in physical juxtaposition to said primary coil and said first adjusting coil, the second adjusting coil having a lesser number of effective turns than said first adjusting coil, and with both the first and second adjusting coils operative at the same time to provide a coarse and fine variable adjustment in the speed of the motor, brush means connected to the terminals of said fixed winding and electrically engaging the respective commutators, and secondary brush means engaging the respective commutators and electrically interconnecting same.

10. A motor according to claim 9, wherein said first brush means are mechanically adjustable on the respective commutators.

11. A motor according to claim 10, wherein said second set of brush means are electrically interconnected outside the magnetic circuit of the motor.

12. A motor according to claim 11, wherein the first adjusting winding is wave wound and the second adjusting winding is lap wound, said wave wound winding having a greater pitch than said lap wound winding.

References Cited by the Examiner
UNITED STATES PATENTS

| | | | |
|---|---|---|---|
| 1,361,546 | 12/20 | Politowski | 310—198 |
| 1,953,803 | 4/34 | Gunner | 310—173 |

ORIS L. RADER, *Primary Examiner.*

MILTON O. HIRSHFIELD, *Examiner.*